United States Patent [19]

Baumann

[11] 4,102,879
[45] Jul. 25, 1978

[54] UNSYMMETRICAL AZOMETHINE 1:2-CHROMIUM COMPLEX DYES

[75] Inventor: Hans Baumann, Ludwigshafen, Fed. Rep. of Germany

[73] Assignee: BASF Aktiengesellschaft, Ludwigshafen, Fed. Rep. of Germany

[21] Appl. No.: 644,958

[22] Filed: Dec. 29, 1975

[30] Foreign Application Priority Data

Jan. 16, 1975 [DE] Fed. Rep. of Germany ....... 2501469

[51] Int. Cl.² ..................... C09B 45/16; C09B 55/00; C07F 11/00
[52] U.S. Cl. ............................. 260/149; 260/145 C; 260/151; 260/206; 260/207; 260/429 C; 260/438.5 R; 260/507 R; 260/509
[58] Field of Search .................. 260/145 A, 149, 151, 260/429 C, 438.5 R

[56] References Cited

U.S. PATENT DOCUMENTS

| 2,116,913 | 5/1938 | Schmidt et al. ................. 260/429 C |
| 2,345,485 | 3/1944 | Krzikalla et al. ..................... 260/438 |

OTHER PUBLICATIONS

A.P.C. Application of Mueller et al, Ser. No. 391,542, Published Apr. 27, 1943.
Pfeiffer et al, Chem. Ber., vol. 74, pp. 935 to 941 (1941).
Vinkataraman, "The Chemistry of Synthetic Dyes", vol. 1, p. 270 (1952).

Primary Examiner—Floyd D. Higel
Attorney, Agent, or Firm—Keil, Thompson & Shurtleff

[57] ABSTRACT

Compounds of which the anion corresponds to the formula

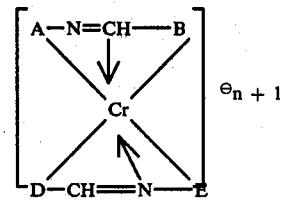

where A is the radical of a carbocyclic amine component containing sulfonic acid groups and having a complex-forming hydroxyl group or carboxyl group in the position adjacent to the azo bridge, B and D are the radical of a carbocyclic aldehyde having a complex-forming hydroxyl group in the position adjacent to the azomethine bond, E is an aliphatic radical or a carbocyclic radical having a complex-forming hydroxyl group or carboxyl group in the position adjacent to the azomethine group and n is the number of carboxyl groups not participating in complex formation and of the sulfonic acid groups. The compounds are outstandingly suitable for dyeing natural and synthetic nitrogenous materials, especially wool and nylons, giving dyeings with excellent light fastness and wet fastness properties, eg. fastness to perspiration, water, sea water and washing.

6 Claims, No Drawings

UNSYMMETRICAL AZOMETHINE 1:2-CHROMIUM COMPLEX DYES

The present invention relates to 1:2-chromium complexes of which the anion corresponds to the formula I

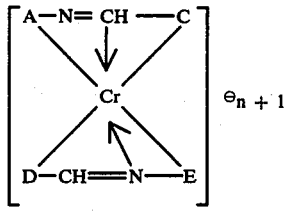

where A is the radical of a carbocyclic amine component containing one or more sulfonic acid groups and having a complex-forming hydroxyl group or carboxyl group in the position adjacent to the azo bridge, B and D are the radical of a carbocyclic aldehyde having a complex-forming hydroxyl group in the position adjacent to the azomethine bond, E is an aliphatic radical or a carbocyclic radical having a complex-forming hydroxyl group or carboxyl group in the position adjacent to the azomethine group and $n$ is the sum of the total number of carboxyl groups not participating in complex formation and of the total number of sulfonic acid groups.

Examples of cations present in the complexes are alkali metal, ammonium or substituted ammonium cations, such as sodium, potassium, ammonium, trimethylammonium, tributylammonium, dimethyldibenzylammonium, di-β-hydroxyethylammonium, β-ethylhexylammonium, γ-(β-ethylhexoxy)-propylammonium or i-propoxypropylammonium. In the free acid form of the complex dye, the cation is hydrogen.

In particular, the invention relates to a dye of the formula Ia

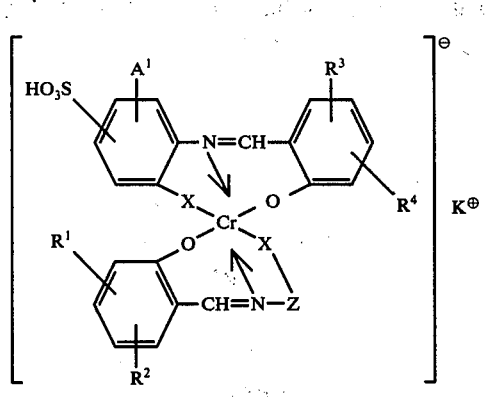

wherein the anion is shown in its free acid form, $A^1$ is hydrogen, hydroxysulfonyl, chlorine, bromine, methyl, methoxy, ethoxy, nitro, alkanoylamino of 1 to 4 carbon atoms or benzoylamino, $R^1$ is hydrogen, chlorine, bromine, nitro, hydroxysulfonyl, phenylazo which is unsubstituted or substituted by chlorine, bromine, methyl, methoxy, ethoxy, nitro or hydroxysulfonyl, or naphthylazo substituted by hydroxysulfonyl, $R^2$ is hydrogen, chlorine, bromine or nitro, $R^1$ and $R^2$ together may also be a fused benzene ring, $R^3$ and $R^4$ independently of one another may be the same radicals as $R^1$ and $R^2$, X is —O— or —COO—, Z is

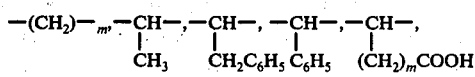

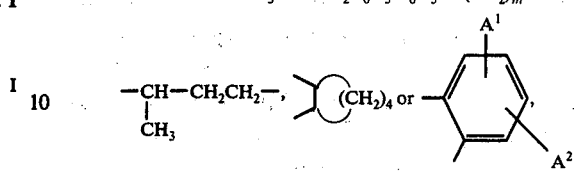

$A^2$ is hydrogen, chlorine, bromine or sulfamoyl which may or may not be N-substituted, $m$ is 1, 2 or 3, and K is a cation.

Examples of alkanoylamino radicals $A^1$ are butyrylamino, propionylamino, formylamino and especially acetylamino.

Examples of N-substituted sulfamoyl radicals $A^2$ are monoalkylsulfamoyl or dialkylsulfamoyl, where alkyl is of 1 to 4 carbon atoms, such as methylsulfamoyl, ethylsulfamoyl, propylsulfamoyl, butylsulfamoyl, dimethylsulfamoyl, diethylsulfamoyl, dipropylsulfamoyl and dibutylsulfamoyl and phenylsulfamoyl, as well as sulfopyrrolidide, sulfopiperidide and sulfomorpholide.

Examples of aromatic carbocyclic compounds, containing sulfo groups, of the formula $HANH_2$ or $HENH_2$ are 2-aminophenol-4-sulfonic acid, 4-chloro-2-aminophenol-6-sulfonic acid, 4-nitro-2-aminophenol-6-sulfonic acid, 6-nitro-2-aminophenol-4-sulfonic acid, 2-aminobenzoic acid, 4-sulfonic acid, 5-phenyl-azo-2-aminophenol-4'-sulfonic acid, 4-(2'-naphthylazo)-2-aminophenol-5'-sulfonic acid, 4-(2',5'-dichlorophenylazo)-2-aminophenol-4'-sulfonic acid and 4-(2'-methoxyphenylazo)-2-aminophenol-5'-sulfonic acid.

Further examples of compounds $H-E-NH_2$ are 2-aminophenol, 4-methyl-4-aminophenol, 4-chloro-2-aminophenol, 4,6-dichloro-2-aminophenol, 4- or 5-nitro-2-aminophenol, 4-methyl-6-nitro-2-aminophenol, 4-chloro-5-nitro-2-aminophenol, 4,6-dinitro-2-aminophenol, 4-nitro-6-acetylaminophenol, 2-aminophenol-4-sulfonic acid amide, 2-amino-4-methylphenol-5-sulfonic acid methylamide, 2-aminophenol-4-sulfonic acid diethylamide, 2-aminophenol-4-sulfonic acid anilide, 2-aminobenzoic acid, 5-nitro-2-aminobenzoic acid, 4-chloro-2-aminobenzoic acid, 3-amino-4-hydroxybenzoic acid, 3-amino-4-hydroxybenzophenone-2'-carboxylic acid, 1-aminoethan-2-ol, 1-aminopropan-2-ol, 1-aminopropan-3-ol, 1-amino-2-phenylethan-2-ol, aminoacetic acid, 2-aminopropionic acid, 3-aminopropionic acid, 2-amino-3-phenylpropionic acid and aminosuccinic acid.

Examples of compounds H-B-CHO or H-D-CHO are: 2-hydroxybenzaldehyde, 2-hydroxy-1-naphthaldehyde, 3-nitro-2-hydroxybenzaldehyde, 5-nitro-2-hydroxybenzaldehyde, 3,5-dinitro-2-hydroxybenzaldehyde, 5-bromo-2-hydroxybenzaldehyde, 3,5-dichloro-2-hydroxybenzaldehyde, 2-hydroxy-1-naphthaldehyde-3-carboxylic acid, 2-hydroxybenzaldehyde-5-sulfonic acid, 5-(2',5'-dichlorophenylazo)-2-hydroxybenzaldehyde, 5-(2'-methoxyphenylazo)-2-hydroxybenzaldehyde-5'-sulfonic acid methylamide and 5-(2'-chlorophenylazo)-2-hydroxybenzaldehyde-5'-sulfonic acid.

The 1:2-chromium complexes are prepared in stages, suitably by starting from the 1:1-chromium complexes of the azomethine compounds of the formula A—N=•

CH—B, which are obtained in accordance with conventional processes.

The reaction of the 1:1-chromium complexes with the azomethine compounds of the formula D—CH=N—E or with their individual components is carried out in aqueous solution or suspension, if appropriate in the presence of organic solvents, eg. alcohols or carboxylic acid amides. The formation of the 1:2 complex takes place under weakly acid to alkaline conditions, preferably at pH from 6 to 9, and at elevated temperatures, eg. at from 50° C to the boiling point.

The 1:2-complexes formed are isolated by acidifying the mixture, salting out with alkali metal salts or evaporation; this gives water-soluble complex salts. To prepare water-insoluble organophilic dyes, the complexes are precipitated from aqueous solution with suitable nitrogen-containing bases which provide the cations.

Nitrogen-containing bases used to prepare the solvent dyes are fairly long-chain alkylamines or cycloalkylamines preferably of 6 to 16 carbon atoms, eg. 2-ethylhexylamine, di-(2-ethylhexyl)-amine, 3-(2'-ethylhexoxy)-propylamine, dodecylamine, isotridecylamine, oleylamine, dicyclohexylamine, N,N'-diphenylguanidine, N,N'-di-(2-methylphenyl)-guanidine, phenylbiguanide, 4-chlorophenylbiguanide and (2-methylphenyl)-biguanide.

The dyes may be used for dyeing or printing natural or synthetic nitrogen-containing materials, eg. wool, nylon or polyurethane fibers.

The dye salts with amine bases, which are water-insoluble but soluble in organic solvents, may be used for dyeing organic liquids, resins or surface coatings, wood stains or ball-pen pastes, for coloring anodized aluminum, or for spin-dyeing, eg. for the manufacture of colored cellulose ester fibers or nylon fibers.

Dyes which are particularly important industrially are those of which the anion corresponds to the formula Ib

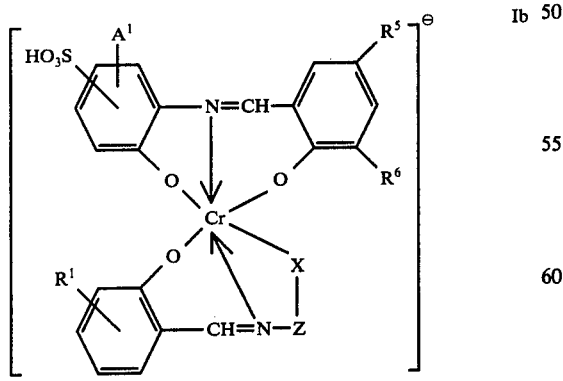

where $R^5$ is hydrogen, chlorine, bromine or nitro, $R^6$ is hydrogen, chlorine, bromine or nitro and $A^1$, $R^1$, X and Z have the meanings give above.

Preferably, $A^1$ is hydrogen, methyl, chlorine or nitro, Z is —$CH_2$—, —$CH_2$—$CH_2$—,

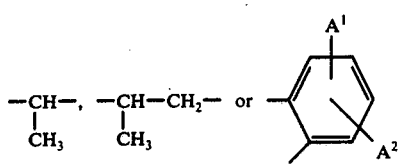

$A^2$ is preferably hydrogen, chlorine, nitro or hydroxysulfonyl and $R^1$ is preferably

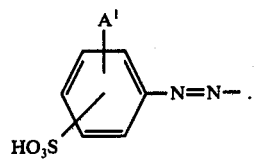

In the Examples, parts and percentages are by weight, unless stated otherwise.

EXAMPLE 1

35.5 parts of 5-(4'-methyl-5'-chlorophenylazo)-2-hydroxybenzaldehyde-2'-sulfonic acid and 14 parts of anthranilic acid are dissolved in 400 parts of water, at 50° C, with the aid of 4.8 parts of sodium hydroxide. 44 parts of the 1:1-chromium complex compound of the azomethine from 4-nitro-2-aminophenol-6-sulfonic acid and salicylaldehyde are added at 70° C, whilst stirring, and the pH is kept at from 7.5 to 8 by adding sodium hydroxide solution. The formation of the 1:2-complex is followed by thin layer chromatography. When the reaction has ended, 180 parts of sodium chloride are added and the product is filtered off and dried at 80° C. 94 parts of the dye of the formula

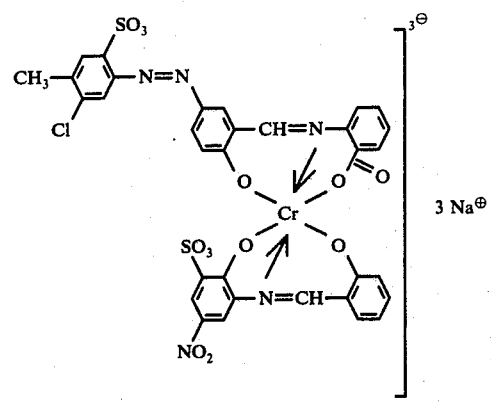

are obtained. This dye gives a yellow solution in water, and produces reddish yellow dyeings of very good light fastness and wet fastness on wool and nylons. The dyes shown in the Table which follows are obtained analogously:

| Example | 1:1-Chromium complex of | Azomethine compound | Hue |
|---|---|---|---|
| 2 | 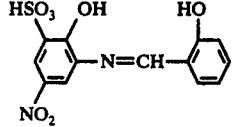 | 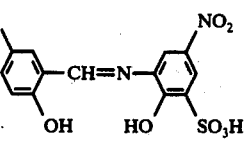 | yellow orange |
| 3 | 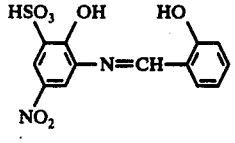 | 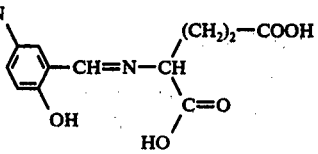 | yellow |
| 4 | " | 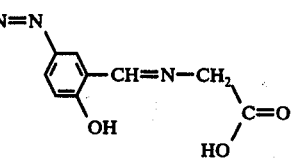 | orange brown |
| 5 | " | 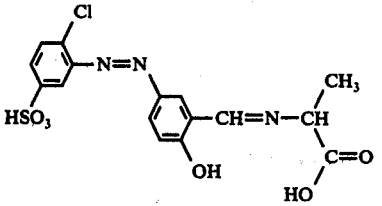 | orange |
| 6 | " | 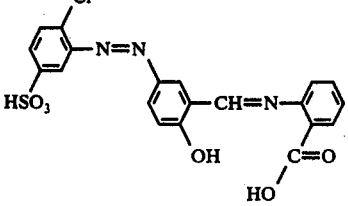 | yellow |
| 7 | " | 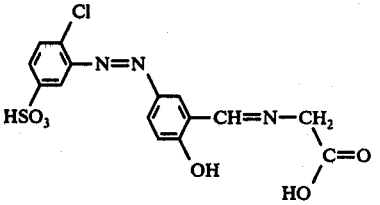 | yellow |
| 8 | " | 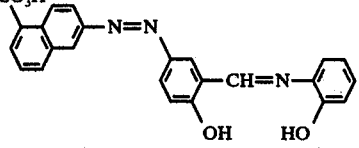 | orange |
| 9 | " | 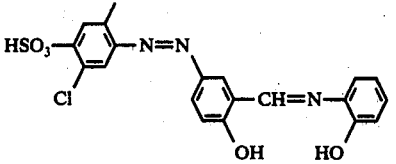 | reddish orange |

| Example | 1:1-Chromium complex of | Azomethine compound | Hue |
|---|---|---|---|
| 10 | " | (structure: dichloro-sulfo-phenyl-N=N-phenol-CH=N-phenyl-COOH) | yellow brown |
| 11 | " | (structure: dichlorophenyl-N=N-hydroxyphenyl-CH=N-hydroxyphenyl-SO₂NH₂) | orange |
| 12 | (structure: HSO₃, OH, Cl-phenyl-N=N-hydroxyphenyl) | (structure: dichloro-HSO₃-phenyl-N=N-hydroxyphenyl-CH=N-phenyl-COOH) | yellow |
| 13 | " | (structure: dichloro-HSO₃-phenyl-N=N-hydroxyphenyl-CH=N-CH₂-COOH) | yellow |
| 14 | (structure: HSO₃, OH, Cl-phenyl-N=N-hydroxyphenyl) | (structure: NH-SO₂-phenyl-N=N-hydroxyphenyl-CH=N-CH₂-COOH) | yellow |
| 15 | (structure: HSO₃, OH, NO₂-phenyl-N=CH-hydroxynaphthyl) | (structure: HSO₃-phenyl-N=N-hydroxyphenyl-CH=N-CH(CH₃)-COOH) | yellow orange |

EXAMPLE 16

8.5 parts of aminoacetic acid and 44 parts of the 1:1-chromium complex compound of the azomethine from 4-nitro-2-aminophenol-6-sulfonic acid and salicylaldehyde are dissolved in 350 parts of water, at 50° C, with the aid of 4.2 parts of sodium hydroxide. 12.5 parts of salicylaldehyde are added dropwise at from 60° to 70° C whilst stirring and the pH is kept at 7.2 by further addition of sodium hydroxide. After the 1:2-complex has been formed, the mixture is diluted with 800 parts of water and the complex is precipitated with 200 parts of sodium chloride. 74 parts of the compound of the formula

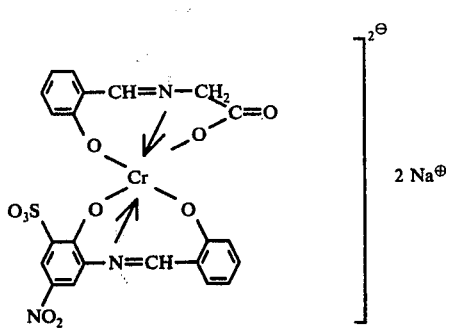

are obtained. This compound gives yellow dyeings with good fastness properties on nylons. The dyes shown in the Table which follows are obtained analogously:

| Example | 1:1-chromium complex of | Azomethine compound | Hue |
|---|---|---|---|
| 17 | 2-hydroxy-3-[(2-hydroxyphenyl)methyleneamino]-5-nitrobenzenesulfonic acid (HSO₃, OH, NO₂ substituted benzene with N=CH linked to 2-hydroxyphenyl) | 1-[(2-carboxy-4-sulfophenyl)iminomethyl]-2-hydroxynaphthalene | reddish yellow |
| 18 | " | 2-[(5-nitro-2-hydroxybenzylidene)amino]benzoic acid | yellow |
| 19 | " | 3,5-dichloro-2-hydroxybenzylidene-(3-nitro-2-hydroxy-5-sulfo)aniline | yellow orange |
| 20 | " | N-(4-diethylamino-2-hydroxybenzylidene)glycine | yellow |
| 21 | " | 5-chloro-2-hydroxybenzylidene-2-hydroxyaniline | yellow orange |
| 22 | " | 2-hydroxybenzylidene-(2-hydroxy-5-sulfamoyl)aniline | " |
| 23 | 2-hydroxy-3-[(2-hydroxyphenyl)methyleneamino]-5-nitrobenzenesulfonic acid | 3,5-dichloro-2-hydroxybenzylidene-2-aminobenzoic acid | greenish yellow |
| 24 | 5-chloro-2-hydroxy-3-[(2-hydroxyphenyl)methyleneamino]benzenesulfonic acid | N-(2-hydroxybenzylidene)glycine | yellow |

| Example | 1:1-chromium complex of | Azomethine compound | Hue |
|---|---|---|---|
| 25 | " | [2-hydroxybenzylidene-2-aminobenzoic acid structure: phenol-CH=N-phenyl-COOH] | yellow |
| 26 | [HSO₃, OH on one ring; HO, Cl on other ring; N=CH bridge; NO₂ and Cl substituents] | [salicylaldehyde-phenylalanine Schiff base: phenol-CH=N-CH(CH₂-C₆H₅)-COOH] | yellow |
| 27 | [HSO₃, OH on one ring; HO on other ring; N=CH bridge; Cl substituents] | [Cl-phenyl-N=N-phenyl(HSO₃)-CH=N-phenyl(OH, HOOC)-SO₃H] | yellow orange |
| 28 | " | [HSO₃-phenyl-N=N-phenyl-CH=N-phenyl(Cl, HO, SO₃H); OH] | orange |
| 29 | " | [2,5-dichlorophenyl-N=N-phenyl-CH=N-phenyl(SO₃H, HO, SO₃H); OH] | orange |

EXAMPLE 30

29 parts of the 1:1-chromium complex compound from 4-nitro-2-aminophenol-6-sulfonic acid and 3,5-nitro-2-hydroxybenzaldehyde (ie. an isomer mixture) are dissolved in 200 parts of ethanol and 100 parts of water with the aid of 2.5 parts of sodium hydroxide. After adding 7.5 parts of salicylaldehyde and 3.8 parts of 2-aminoethanol, the mixture is stirred at 70° C and the pH is kept at from 7.2 to 7.5 by adding sodium hydroxide solution.

After completion of complex formation, a solution of 27 parts of 3-(2-ethylhexoxy)-propyl-1-amine and 12 parts of acetic acid in 200 parts of water is added dropwise. The dye which precipitates after evaporating the solvent is isolated and dried. It is very soluble in alcohols, esters and ketones and dyes surface coatings in neutral yellow colors. The dyes shown in Table which follows are obtained analogously:

| Example | 1:1-chromium complex of | Azomethine | N-base Hue |
|---|---|---|---|
| 31 | 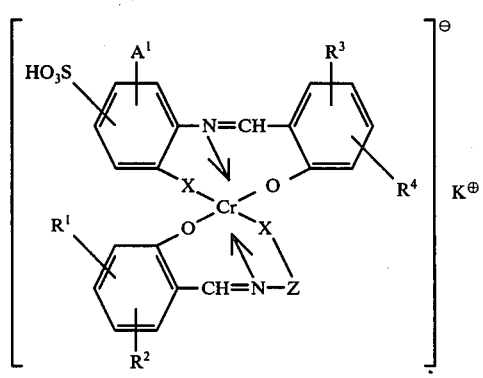 | | Dodecylamine reddish yellow |
| 32 | " | | Oleylamine reddish yellow |
| 33 | | | 3-(2-Ethylhexoxy)-propyl-1-amine yellow orange |

I claim:
1. an unsymmetric azomethine 1:2-chromium complex dye of the formula

Ia wherein the anion is shown in its free acid form,
$A^1$ is hydrogen, hydroxysulfonyl, chlorine, bromine, methyl, methoxy, ethoxy, nitro, alkanoylamino of 1 to 4 carbon atoms or benzoylamino, $R^1$ is hydrogen, chlorine, bromine, nitro, hydroxysulfonyl, phenylazo, phenylazo substituted by chlorine, bromine, methyl, methoxy, ethoxy, nitro or hydroxysulfonyl, or naphthylazo substituted by hydroxysulfonyl, $R^2$ is hydrogen, chlorine, bromine or nitro, $R^1$ and $R^2$ together are a fused benzene ring, $R^3$ and $R^4$ independently of one another have the meanings given for $R^1$ and $R^2$,
X is —O— or —COO—,
Z is

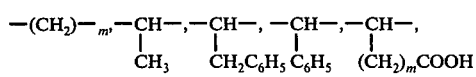

-continued

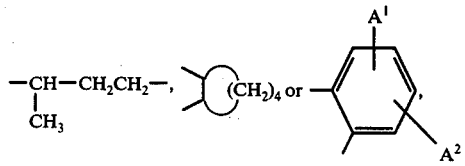

$A^2$ is hydrogen, chlorine, bromine, sulfamoyl or sulfamoyl substituted once or twice by $C_1$— to $C_4$-alkyl, phenyl, tetra-, penta- or hexamethylene or —CH$_2$—CH$_2$OCH$_2$CH$_2$—, m is 1, 2 or 3, and
K is a cation.

2. A dye as claimed in claim 1, of which the anion corresponds to the formula

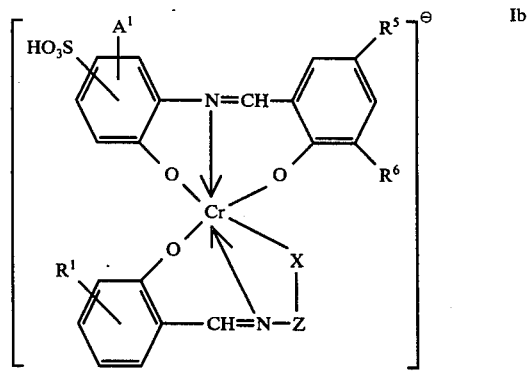

Ib where $R^5$ is hydrogen, chlorine, bromine or nitro, $R^6$ is hydrogen, chlorine, bromine or nitro and $A^1$, $R^1$, X and Z have the meanings given in claim 1.

3. A dye as claimed in claim 2, in which $R^1$ is

4. A dye in its free acid form according to claim 1 of the formula
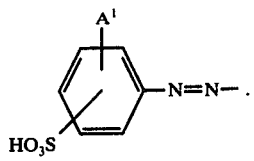
5. A dye in its free acid form according to claim 1 of the formula
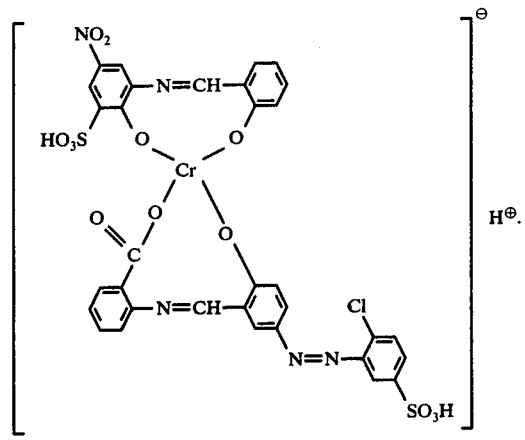
6. A dye in its free acid form according to claim 1 of the formula
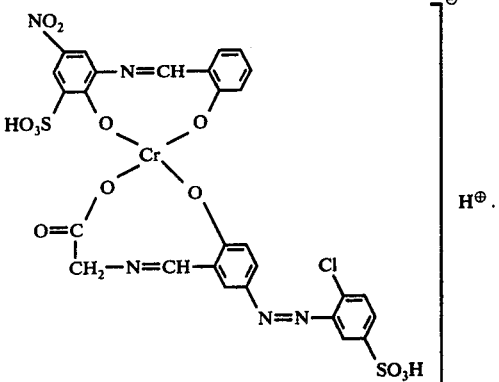
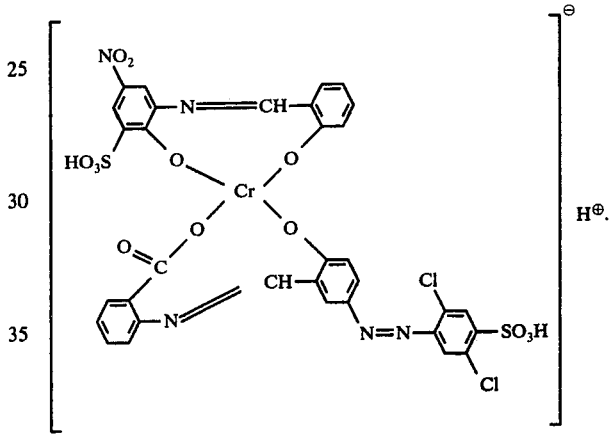
* * * * *